United States Patent [19]

Walls-Muycelo

[11] 4,308,065
[45] Dec. 29, 1981

[54] LIGHTWEIGHT POROUS AGGREGATE COMPRISING ALKALI METAL BOROSILICOALUMINATE AND PROCESS FOR THE PREPARATION THEREOF

[76] Inventor: José Walls-Muycelo, Xola No. 309-4, Mexico City 18, D.F., México

[21] Appl. No.: 69,906

[22] Filed: Aug. 27, 1979

Related U.S. Application Data

[63] Continuation-in-part of Ser. No. 946,782, Sep. 28, 1978, abandoned.

[30] Foreign Application Priority Data

Sep. 30, 1977 [MX] Mexico .................................. 170759

[51] Int. Cl.$^3$ ............................................. C04B 31/00
[52] U.S. Cl. ......................................... 501/81; 106/75; 106/288 B; 501/85; 501/99
[58] Field of Search ................... 106/40 R, 75, 97, 98, 106/73.4, 288 B

[56] References Cited

U.S. PATENT DOCUMENTS

| | | | |
|---|---|---|---|
| 2,047,016 | 7/1936 | Elias | 106/75 |
| 2,117,605 | 5/1938 | Fowler et al. | 106/75 |
| 3,700,470 | 10/1972 | Barton | 106/75 |
| 3,776,746 | 12/1973 | Abe | 106/75 |
| 3,793,039 | 2/1974 | Rostoker | 106/41 |
| 3,840,380 | 10/1974 | Kraemer et al. | 106/75 |
| 3,990,901 | 11/1976 | Engstrom et al. | 106/40 R |
| 4,162,166 | 7/1979 | Walls-Muycelo | 106/75 |

*Primary Examiner*—James Poer
*Attorney, Agent, or Firm*—Darby & Darby

[57] ABSTRACT

A lightweight aggregate comprising an alkali metal borosilicoaluminate, is in the form of discrete, porous and expanded particles of approximately spherical shape, has a specific weight between about 60 and about 600 kg/m$^3$ and a compression strength of from about 140 kg/cm$^2$ up to about 250 kg/cm$^2$, is highly insoluble in water, steam, acids or bases, has a melting temperature above 1500° C. and a low alkalinity, and chemically comprises a homogeneous admixture of acid, basic and amphoteric oxides.

A highly preferred embodiment of the aggregate has an $M_2O/B_2O_3$ ratio between about 3:1 to about 6:1, where M is an alkali metal.

16 Claims, No Drawings

LIGHTWEIGHT POROUS AGGREGATE COMPRISING ALKALI METAL BOROSILICOALUMINATE AND PROCESS FOR THE PREPARATION THEREOF

NATURE OF THIS APPLICATION

This application is a continuation-in-part of U.S. patent application Ser. No. 946,782 filed Sept. 28, 1978.

BACKGROUND OF THE INVENTION

The present invention refers to lightweight aggregates in the form of discrete, porous and expanded particles, for use in concretes, mortars, building blocks and other similar building elements and, more particularly, it is related to lightweight aggregates having an increased strength accompanied by a considerably low density and a high insolubility in water or steam, as well as very high melting temperatures, and to a process for the manufacture of said aggregates.

It is a well known fact that aggregates have been used for long in the building arts and that in accordance with the knowledge gained from the nature of said aggregates, it has been always known that for high compression strength, high temperature resistance and high adhesion of the concretes, the well recognized construction codes call for the use of only heavy and strong aggregates which are not lightweight in their nature. The use of lightweight porous aggregates has been generally restricted to elements that do not require a very high strength of the material, such as in partitions, coverage slabs and the like, but are generally excluded from structural elements such as struts, girders, beams and the like, particularly in view of the fact that all the lightweight aggregates available in accordance with the prior art, were selected from low strength aggregates such as pumice, lava, slag, fired clay, shale or cinders from coal or coke, and the like. All these materials used for aggregates, as well as some other artificially prepared aggregates on the basis of expanded bentonites and expanded silicates, have left much to desire as to the strength of the material produced with the use thereof, in view of the fact that all such aggregates, in the first place, are available in very few particle sizes, and therefore do not lend themselves for a variety of uses, particularly in view of the fact that all the prior art aggregates are of a small particle size, which required the provision of larger amounts of water whereby the strength of the binders is reduced and cracks are caused in the cured mass when dried.

In the case of the prior art expanded silicate materials, these materials were highly brittle, whereby the particle size could not be increased and, on the other hand, showed a high alkalinity, which caused a chemical reaction with the common binders used and, therefore, the material was furtherly degraded with the consequent loss of strength in the final product.

Therefore, in accordance with the prior art knowledge of different types of aggregates for use in concrete construction, it was considered impossible to obtain mortars or concretes having a high strength and at the same time a very low weight, because these two properties of the concretes and mortars were considered to be exclusive of each other, whereby if a high strength was required, then heavyweight aggregates had to be used in order to provide such a high strength, without any possibility of producing a lightweight building material. On the other hand, when the weight of the material was the dominant characteristic, then the inclusion of lightweight aggregates of the above mentioned nature caused a considerable decrease in the strength of the material produced, whereby it was practically impossible to obtain a concrete or a mortar having both characteristics in conjunction.

Porous aggregates artificially prepared from expanded sodium silicates are also well known, such as is disclosed in U.S. Pat. No. 3,990,901. In the particular case of said patent, such aggregates comprise basically a sodium silicate accompanied by certain oxides to give special properties to the product and a hydraulic binder such as Portland Cement or blast furnace slag, which is subjected to a heating process in two different stages to form pores that reduce the specific weight of the material in an important proportion. However, the alleged lightweight aggregate of U.S. Pat. No. 3,990,901, which contains a hydraulic binder, necessarily results in relatively high specific weights, whereby the fundamental purposes of providing a sufficiently lightweight and yet strong aggregate for use in structural members built with concretes are not achieved and, on the other hand, said addition of a hydraulic binder has as its only objective to avoid the drying steps that otherwise must be effected in the process for preparing the aggregates, but in the prejudice of the low density of the product obtained, whereby the porous aggregates of U.S. Pat. No. 3,990,901 have left much to desire in view of their relatively high density and their unusefulness for various uses, particularly structural uses.

In U.S. application Ser. No. 718,276 filed Aug. 27, 1976 by the same inventor of the instant application, (continued with application Ser. No. 901,873, now U.S. Pat. No. 4,162,166) the production of a lightweight particulate porous aggregate is achieved basically by the addition, to an admixture of sodium silicate, silica and an alkaline earth metal silicate, of boric acid or borax to provide a boric oxide in the final product, which permits the production of particulate porous aggregates having a very low specific weight and yet a high physical strength, whereby such lightweight aggregates solved the majority of the problems extant in connection with the prior art aggregates, including those of U.S. Pat. No. 3,990,901 mentioned above. However, the aggregates obtained by means of the process of the above U.S. Pat. No. 4,162,166, still present serious drawbacks, such as the fact that the starting materials are relatively costly and, on the other hand, such aggregates are not provided with a suitable water or steam insolubility, whereby their usefulness is restricted to structural members that will not be steam-cured, inasmuch as said accelerated type of curing process causes the solubilization of the aggregates and, consequently, the destruction thereof.

Lightweight foamed glass products are disclosed in U.S. Pat. No. 3,793,039 to Rostoker, which have an apparently similar composition as the aggregates of the instant invention. However, Rostoker does not obtain a truly lightweight material and the expansion of the foamed glass disclosed in said patent must be aided by means of a so called cellulating agent (carbon or carbon releasing compounds) to accomplish the goal of reducing the specific weight of the products. Said products, however, reportedly have a specific weight of from about 400 to about 500 kg/m$^3$ and their mechanical strength undoubtedly must leave much to desire, because the inclusion of the cellulating agent to cause formation of pores at random, adversely affects the structural integrity of the foamed glass, whereby Rostoker has no intention whatsoever and does not even suggest that said products might have use as building aggregates. The main concern of Rostoker is to obtain a foamed glass block having high resistance to thermal shock, hence the reason of having to use a cellulating agent comprising carbon.

The failure of Rostoker to obtain a truly lightweight material having sufficient structural resistance to serve as an aggregate is believed to have been caused by the fact that Rostoker does not realize that the extremely low ratios of $M_2O/B_2O_3$ (with M being an alkali metal) used in the foamed glass, do not produce sufficient pore formation in the material and therefore do not permit the obtention of a low density product with high structual strength, even through the use of the cellulating agent.

Therefore, for long there has been the need, in the construction techniques, of producing a lightweight aggregate which, besides its lightness, will prevent a high compression strength, a low alkalinity which may avoid side reactions with the binders utilized for producing concretes therewith, a high melting temperature and, at the same time, a high degree of insolubility in water cr steam in order to render it suitable for use in concretes that will be subjected to the accelerated curing process by means of steam.

BRIEF SUMMARY OF THE INVENTION

Having in mind the defects of the prior art aggregates, it is an object of the present invention to provide a particulate lightweight aggregate which, while providing a very low density, will also present a very high strength to compression, flexural and shearing stresses, as well as high melting temperature and a high insolubility in water and steam.

It is a further object of the present invention to provide a particulate lightweight aggregate of the above identified character, which will not depend on the utilization of costly raw materials such as sodium silicate and the like and which, however, will be absolutely expandable up to a very low density by means of relatively simple processes.

It is another object of the present invention to provide a particulate lightweight aggregate of the above indicated nature, which will be very economical in view of the utilization of easily available starting materials for production thereof and which, however, will provide a very high quality product.

It is a further and more specific object of the present invention to provide a particulate lightweight aggregate, which will present small craters on its surface which, together with a low alkalinity, will permit its suitable adherence to the common binders used for the preparation of concretes.

Another specific object of the present invention is to provide a particulate lightweight aggregate of the above mentioned character, which will also show a very high insolubility not only in water and steam but also in concentrated and diluted acids and in alkaline solutions.

One more object of the present invention is to provide a method for the preparation of a particulate lightweight aggregate of the above mentioned character, which method will be highly economical in its performance and yet highly efficient to provide a material having particles of the desired sizes and having a low weight, a high strength and a large number of pores.

The foregoing objects and other ancillary thereto are preferably accomplished as follows: to a concentrated solution of an alkali metal hydroxide, particularly sodium hydroxide, suitable amounts of kaolin, silicon oxide in any of its mineral forms, boric acid or borax, urea and one or more heavy metal oxides such as iron, zinc, lead or titanium oxides in any of their mineral forms, are added, whereby a reaction is initiated and a spontaneous increase in temperature is effected up to a temperature of about 70° to 80° C. The reaction mixture is allowed to react until there is no further increase in the temperature and said temperature remains unaltered during a predetermined period of time and then the thus obtained material is dried at a temperature of about 300° C., whereafter the dried mass is crushed in order to form particles of the desired sizes. Finally, the dried particles are heated or fired to a temperature of from about 650° C. to 850° C., preferably 700° C. in order to expand and vitrify the product, whereby approximately spherical particles are obtained having craters on their outer surfaces and with the characteristics of lightness, strength and insolubility mentioned above.

The novel features that are considered characteristic of the present invention are set forth with particularity in the appended claims. The invention itself, however, both as to its organization and its method of operation, together with additional objects and advantages thereof, will best be understood from the following detailed description of certain specific embodiments of the invention, which must be considered as merely illustrative and not limitative of the true scope and spirit thereof.

DETAILED DESCRIPTION

The particulate lightweight porous aggregate according to the present invention comprises particles of controlled size of a material basically comprising an expanded sodium borosilicoaluminate which may contain variable proportions of silicoborates, silicoaluminates and boroaluminates of sodium, potassium, magnesium, iron and titanium, depending on the starting materials used for its preparation. The product, once fired and expanded, comprises a plurality of particles having an approximately spherical shape and variable diameters, with inner cavities of different sizes and shapes. The material is very light, having specific weights of between about 60 to 600 kg/m$^3$ whereby it floats in the water, and is also practically insoluble in water as well as in steam. The product shows high melting temperatures which are always higher than about 1500° C. and a pH of from 8 to 9, whereby this product may be considered as a low alkalinity material which will not have any adverse influence on the commonly used binders for the production of concretes and mortars.

The porous and lightweight aggregate in accordance with the present invention also shows a very low thermal, electrical and acoustic conductivity, which enables the same to be utilized as thermal, electrical and acoustic insulation. On the other hand, the particles of the aggregate show small craters on their surface which, together with the low alkalinity of the product, permit a suitable adherence to the concrete binders.

The particulate lightweight porous aggregate material in accordance with the present invention also has a very low cost in view of the fact that the major portion of the starting materials to produce the same are natural products which combination produces an aggregate which is practically insoluble in cold and hot water, in steam, in concentrated or diluted acids or in alkaline solutions. The aggregate is only soluble by means of the alkaline melt procedure or in hydrofluoric acid, which of course cannot be encountered in the process for curing the concretes and mortars prepared with the aid of the aggregate of the present invention.

Now having reference to its composition, the lightweight and porous aggregate in accordance with the present invention is a product composed of a combination of acid, basic and amphoteric oxides, which if used in suitable proportions, confer to the final product excellent properties of lightness, insolubility and strength. Its chemical composition may be defined in principle as that of a sodium borosilicoaluminate having varying proportions of silicoborates, silicoaluminates and boroaluminates mainly of sodium, potassium, magnesium and titanium, depending on the raw materials which may have been chosen for its production.

More particularly, the particulate lightweight porous aggregate of the present invention comprises approximate proportions of from 20 to 92% by weight of silicon dioxide, from 1 to 18% by weight of boric oxide, from 5 to 60% by weight of an alkali metal oxide, particularly sodium oxide, from 1 to 45% by weight of aluminum oxide and from 1 to 20% by weight of suitable additives to give the product special properties in accordance with its use.

A preferred embodiment of the aggregate of this invention, wherein optimal properties of the product are obtained, comprises a formulation wherein the proportions of the various oxides are as follows: about 50 to 85% by weight silicon dioxide, about 1 to 7% boric oxide, about 10 to 25% sodium oxide, about 1 to 10% aluminum oxide and about 1 to 20% of the above mentioned additives to provide the product with special properties.

The aggregate of this invention wherein the specific weight is minimized without thereby adversely affecting the structural strength thereof, is of a composition such that the $M_2O/B_2O_3$ ratio is of from about 3 to 6. By keeping the amounts of the alkali metal oxide and the boric oxide such that the above ratio is obtained, specific weights as low as from about 60 to about 100 kg/m$^3$ are obtainable, with compression strengths of from about 140 to about 175 kg/cm$^2$.

Compositions wherein the proportions of the various ingredients are such that the $M_2O/B_2O_3$ ratio is between 3 and 6, therefore, represent the most preferred embodiment of the present invention.

From perusal of the above formulations, it will be clearly seen that the product of the present invention may be obtained from a great diversity of starting materials which are easily available in nature.

It will thus be seen that the preferred basic oxide is sodium oxide, but that this oxide may be changed to potassium oxide with however a correspondingly increased cost. The main source of sodium oxide is caustic soda or sodium hydroxide, together with the additional sodium content that is supplied by the minerals which will be the source of the acid oxides and the amphoteric oxides that will be described hereinbelow.

The preferred acid oxides are silicon dioxide and boric oxide, which may be supplied through the use of starting materials which are mineral products, such as, in the case of the silicon oxide, sand, tripoli, kaolin, soil, bentonite, fuller earth, bauxite, feldspar, staurolite, kieselgur, chalcedony, etc. In the case of the boron oxide, substances such as aluminum borate, sodium tetraborate, and boric acid may be used.

The preferred amphoteric oxide that may be used in the above formulation is aluminum oxide, which may be supplied by starting materials such as kaolin, gibbsite, diaspore, bauxite, staurolite, andalusite, orthoclase, alunite, etc.; as well as by means of substances such as sodium aluminate or aluminum borate.

As it may be seen from the above, the fact that any of the above indicated raw materials may be used as sources of the acid, basic and amphoteric oxides that are necessary in the chemical system of the present invention, is considered as one of the main advantages of the particulate lightweight porous aggregate of the present invention. Of course that it will be necessary to know the quantitative analysis of the starting materials which may be chosen, in order to be able to calculate the suitable percentage thereof and then adjusting the composition by adding the oxide or oxides which are missing, in order to supply the proportions given in the basic formulations of oxides described above.

The above mentioned materials, used in the suitable proportions so that the basic formulation of the product may fall within the above described ranges of proportions of oxides, enable the obtention of lightweight and porous aggregates which do not lose characteristics which are considered as highly important, such as insolubility, strength and lightness, even when they may not show said characteristics in an optimal degree, because the latter is represented only by the specific formulation given above in this respect.

As to the various additives that may be added to the above described basic formulation, said additives may be of highly variable nature and may be added within the proportions indicated in the above described formulations, either through the use of one single substance selected from those which will be described hereinbelow or by selecting several of said substances.

As additives that may be used in the formulation of the present invention, preferred additives to increase the expansion of the product to a maximum degree are calcium phosphate, whiting, sodium nitrate, potassium nitrate, sodium oxalate and potassium oxalate. Other additives that increase the expansion of the product to an intermediate degree and that may also be used to obtain materials of low density within the above described intermediate range are, for instance, iron oxide, zinc oxide, lead oxide and heavy magnesia. On the other hand, cinders and soil may be considered as additives which increase the expansion but only to a minimum degree, whereby they are used when the lightness is not the dominant factor, inasmuch as their utilization always produces porous agregates that fall within the upper range of densities, that is, in the neighborhood of about 600 kg/m$^3$.

Other additives that may be used in accordance with the present invention in order to improve the geometrical shape of the particles as well as the uniformity of the pores produced therein to a maximum degree are, for instance, certain volatile solvents such as acetone and methylethylketone, and preferably urea and carbon black. Also, in order to improve the geometrical shape and the pore distribution to an intermediate degree, other type of additives such as iron oxide, cinders and soil may be used.

Additives which increase the strength of the aggregate to a maximum degree are preferably one or more of aluminum hydroxide, soil, cinders, aluminum acetate, copper acetate, amyl acetate, ethyl acetate and aluminum oxide. Additives that may increase said strength on the aggregates of the present invention to an intermediate degree are ferrous oxide, zinc oxide, lead oxide and titanium dioxide.

Finally, it has been shown that the addition of an alkaline-earth metal oxide, particularly magnesium oxide, considerably increases the hardness of the particles obtained in accordance with the present invention.

The particulate lightweight porous aggregates in accordance with the present invention are prepared by means of a process which comprises firstly preparing a concentrated aqueous solution of the selected alkali metal hydroxide, particularly sodium hydroxide, in admixture with the suitable proportions of kaolin as a combined source of silicon oxide and aluminum oxide, as well as other mineral substances for completing the required proportions of silicon oxide as may be necessary, a boric acid source and the additives that may be desirable to be incorporated in the mixture, such as an additive to increase the expansion of the product, for instance, iron oxide or potassium nitrate, an additive to improve the geometrical shape and the pore distribution, such as urea or a volatile solvent, and an additive to increase the strength, such as volcanic ash or other suitable material.

The mineral products and substances described above, that are added to the alkali metal hydroxide solution, must be chosen such that the amounts thereof will be suitable to provide the proportions of oxides that are desired in the final product.

As soon as the solid ingredients are added to the water for forming an aqueous paste, it is observed that a chemical reaction commences and that the temperature is spontaneously raised up to about from 70° to 80° C. Once said temperature is reached and there is no further increase in the temperature during a predetermined period of time, this first part of the chemical reaction is considered as completed.

The thus obtained product is then subjected to a drying step at a temperature of about 300° C. and then the dried material is reduced to particles by means of grinding or crushing. The dried and ground product is then passed through a furnace where it is fired until a temperature of from about 650° to 850° C., preferably 700° C., is reached, in order to expand and slightly vitrify its surface.

In the process of the present invention it is observed that the product is not strongly expanded before the maximum temperature of the system is reached, whereby it is considered that in the first phase of the reaction some silicates, borates and aluminates of the metals contained in the system are formed, to thereafter complete the formation of more complex systems at the said elevated temperature, such as borosilicoaluminates, silicoborates, boraluminates and silicoaluminates of the existing metals and it is precisely at this time when the maximum expansion occurs.

The above, of course, results in a very uniform product, inasmuch as the maximum degree of expansion and pore distribution in the particles occur in a practically instantaneous manner at the end of the process, whereby there is no possibility that the particles may be collapsed during processing thereof. Therefore, the process in accordance with the present invention represents a remarkable technical improvement over all the processes for the obtention of artificial porous lightweight aggregate in accordance with the prior art.

The present invention will be best understood by having reference to the following illustrative and non limitative examples thereof.

EXAMPLE 1

80 parts by weight of sodium hydroxide are dissolved in a kettle in 60 parts by weight of water until a complete dissolution is obtained, in order to form a concentrated aqueous solution of caustic soda of about 57% by weight concentration. To the thus formed caustic lye, 200 parts by weight of kaolin, 60 parts by weight of tripoli, 20 parts by weight of borax, 2 parts by weight of potassium nitrate and 2 parts by weight of acetone are added and the mixture is constantly stirred by means of a suitable stirrer until a homogenous and viscous mass is formed. The temperature is autogenously increased and then remains unaltered at an approximate temperature of about 75° C., at which time the reaction is considered as completed.

The viscous mass is then poured into pans which are then charged into a stove at a temperature of 300° C. in order to remove all the free water which remains in the system in order to produce a solid and dried material. The solid and dried material is then crushed, screened to separate the various particle sizes and the non-expanded particles are then charged to a furnace at a temperature of 700° C. until a maximum expansion of the particles is obtained.

The particles are allowed to cool slowly down to room temperature, whereby a porous aggregate is obtained having approximately spherical particles with a great plurality of craters formed on their surface and having a density of 65 kg/m$^3$, a compression strength of 140 kg/cm$^2$, a melting temperature of 1650° C. and a pH of 8.5.

The thus obtained particles were incorporated into a mass of Portland Cement in order to obtain a concrete having a proportion of aggregate to cement of 1:6, and the concrete was steam cured for 24 hours. A transverse cut of the samples of the thus cured concrete shows that the particles of the aggregate were unaltered by the steam curing process, which means that the particles are completely insoluble in water and steam.

EXAMPLE 2

In a kettle provided with agitating paddles, 43 parts by weight of sodium hydroxide are dissolved in 40 parts by weight of water, with continuous stirring in order to obtain a complete dissolution, so as to form a concentrated solution of caustic soda of about 52% by weight concentration. To the thus formed caustic lye, 152 parts by weight of silica sand, 62 parts by weight of industrial sodium aluminate, 23 parts by weight of boric acid, 6 parts by weight of potassium nitrate, 2.5 parts by weight of hydrated magnesia and 5 parts by weight of ferric oxide were added, with constant stirring until a homogenous paste is formed. An autogenous increase in the temperature of the reaction mass is noted until a temperature of 74.5° C. is reached. The stirring action is continued until said temperature remains unaltered for a period of various minutes.

The paste is then poured into flat molds and the latter are introduced in a stove at a temperature of 300° C. in order to remove all the remaining free water, thus producing a stone-like dried material. The stone-like dried material is then crushed in a bell type breaker and is screened to separate the various particle sizes, which are separately selected for further treatment.

Each group of particles is introduced in a rotary furnace to increase its temperature up to 730° C., wherey firstly a slight expansion is observed, which becomes a violent expansion with vitrification when said temperature is near the maximum value, whereby highly porous and superficially vitrified particles are obtained having an approximately spherical and uniform shape and showing a great plurality of craters on all their surface.

The expanded particles are allowed to cool down to room temperature, which produces a lightweight and porous aggregate having practically spherical particles of uniform sizes with a great plurality of craters on their surface, and having a density of 78 kg/m$^3$, a compression strength of 147 kg/cm$^2$, a melt temperature of 1680° C. and a pH of 8.2.

Particles of the thus obtained porous aggregate were selected in order to obtain a group of particles having an average diameter of about 1 cm. and said articles were incorporated into a Portland Cement mass in a proportion of 1:6 in order to obtain a concrete which was steam cured during 36 hours in cylindrical molds having a diameter of 20 cm.

The samples of cured concrete were cut in order to show their inner structure, and it was observed that the particles of the porous aggregate were absolutely unaltered by the steam curing process.

EXAMPLE 3

153 parts by weight of kaolin, 85 parts by weight of diatomaceous earth, 65 parts by weight of caustic potash, 13 parts by weight of borax, 2 parts by weight of sodium nitrate and 3 parts by weight of methylethylketone were mixed in the dry state. The mixture was introduced in a ribbon mixer and water was added in an amount sufficient to form a very thick slurry, the dumping of the mass being continued with autogenous increase in the temperature up to a temperature 76.2° C. The dumping action was discontinued when the temperature remained unaltered at the above mentioned value during a period of 10 minutes.

Then the thick and partially reacted slurry was poured in rectangular shallow molds and the loaded molds were introduced in a stove at a temperature of 305° C. until the material was completely solidified and the free water was removed. The dried material was crushed in a mill and the thus obtained particles were introduced in a rotating hearth furnace in order to increase their temperature up to 840° C. The particles were moved through the furnace along a distance of about 3 meters before reaching the burner, whereby a gradual increase in temperature was achieved up to the above mentioned temperature and it could be shown that, in the first heating stage, the particles suffered a very low expansion, while in the zone which is in the neighborhood of the burner, that is, when their temperature was of the order of about 700° C., said particles showed a violent expansion and adopted an approximately spherical shape, with all the superficial bubbles being bursted in order to form a great multiplicity of craters on the surfaces of each particle.

The expanded particles were removed from the furnace and were allowed to cool down to room temperature, whereby a lightweight and porous aggregate with approximately spherical particles having craters on their surface and with a density of about 87 kg/m$^3$, a compression strength of 173 kg/cm$^2$, a melt temperature of 1720° C. and a pH of 8.5 was obtained.

The thus obtained particles of porous aggregate were incorporated into a Portland Cement mixture in varying proportions in order to obtain concretes which were cured with steam during periods of time of from 18 to 36 hours. Inspection of the fractured samples of cured concrete showed that the particles preserved their shape and structure, whereby it was shown that said particles were practically insoluble in steam.

The particles obtained in accordance with the above were subjected to dissolution tests with acids and alkalies, particularly with hydrochloric acid, sulfuric acid and caustic soda, and the particles were found to be practically insoluble therein.

EXAMPLE 4

The process described in example 1 was repeated but without using borax and potassium nitrate, in order to obtain a porous aggregate not containing boron and potassium oxides. The particles of the thus obtained porous aggregate were found to be deficient in that they did not undergo an expansion similar to that of the above examples, even when particles of a porous aggregate were nevertheless obtained, having characteristics highly useful for the preparation of lightweight and strong concrete members.

The porous aggregate obtained by means of this example showed a density of 420 kg/m$^3$, that is, it was a product much heavier than those obtained by means of examples 1 to 3, but its strength was increased to about 250 kg/cm$^2$, whereby this product resulted to be suitable for structural members of higher strength while of also higher specific weight.

The particles of the porous aggregate were also fully water resistant, whereby they were not altered by curing under steam, but they did not resist the proofs of dissolution with alkalies.

EXAMPLE 5

The procedure described in Example 1 was duplicated using the following amounts of ingredients: 80 parts by weight of sodium hydroxide, 60 parts by weight of water, 200 parts by weight of silica sand, 75 parts by weight of kaolin, 200 parts by weight of borax, 2 parts by weight of potassium nitrate and 2 parts by weight of acetone.

The porous aggregate thusly obtained showed a density of 390 kg/m$^3$, a compression strength of 230 kg/cm$^2$, a melting temperature of 1670° C. and a pH of 7.4.

EXAMPLE 6

The procedure described in Example 2 was duplicated using the following amounts of ingredients: 43 parts by weight of sodium hydroxide, 40 parts by weight of water, 152 parts by weight of silica sand, 62 parts by weight of industrial sodium aluminate, 2.5 parts by weight of boric acid, 6 parts by weight of potassium nitrate, 2.5 parts by weight of hydrated magnesia and 5 parts by weight of ferric oxide.

The porous aggregate thusly obtained showed a density of 410 kg/m$^3$, a compression strength of 172 kg/cm$^2$, a melting temperature of 1690° C. and a pH of 9.1.

EXAMPLE 7

The procedure described in Example 3 was duplicated using the following amounts of ingredients: 153 parts by weight of kaolin, 85 parts by weight of diatomaceous earth, 65 parts by weight of caustic potash, 130 parts by weight of borax, 2 parts by weight of sodium nitrate and 3 parts by weight of methyl ethylketone.

The porous aggregate thusly obtained showed a density of 375 kg/m$^3$, a compression strength of 210 kg/cm$^2$, a melting temperature of 1710° C. and a pH of 7.5.

EXAMPLE 8

The procedure described in Example 1 was duplicated, but using an amount of 22.5 parts by weight of borax instead of the 20 parts of said example.

The aggregate obtained showed a density of 62.5 kg/m$^3$, with a compression strength of 145 kg/cm$^2$.

In the following Table, the specific weights of the various aggregates obtained in the above described examples is tabulated in the third column, against their respective $M_2O/B_2O_3$ approximate ratios:

TABLE

| Example | $M_2O/B_2O_3$ | Sp. weight(kg/m$^3$) |
|---|---|---|
| 1 | 3.4 | 65 |
| 2 | 3.8 | 78 |
| 3 | 5.5 | 87 |
| 4 | no boron | 420 |
| 5 | 0.34 | 390 |
| 6 | 41 | 410 |
| 7 | 0.55 | 375 |
| 8 | 3.0 | 62.5 |

The above table shows that there is a remarkable improvement in the specific weights of the aggregates of the instant invention, when the $M_2O/B_2O_3$ ratio is between 3 and 6. It may be seen that higher or lower ratios (Examples 4 to 7) do not accomplish the goal of producing a very low density in the aggregates, whereby this range represents the exceptionally preferred embodiment.

From the above it may be concluded that the presence of boron in the porous aggregates of the present invention, even when not indispensable, is highly useful for improving the density of the porous aggregate without unduly reducing the structural strength, as well as to also improve the insolubility of the products in alkalies.

From the above it can be seen that for the first time a lightweight aggregate has been provided which is chemically formed substantially by an alkali metal borosilicoaluminate accompanied by complex silicoborates, silicoaluminates and boroaluminates, and which is physically formed by discrete approximately spherical particles having a great number of craters on their surfaces, and having a density of from 60 to 600 kg/m$^3$, being highly insoluble in water or steam as well as in acids and alkalies, having high melting temperatures which are higher than about 1500° C., a low alkalinity and being constituted by an homogenous mixture of acid, basic and amphoteric oxides, with suitable additives to give the same the desired specific properties. The strength of these aggregates is very high depending on the density, and varies between about 140 to 250 kg/cm$^2$ and, therefore, they may be used in structural members replacing the traditional heavy aggregates without thereby reducing their mechanical strength.

As the porous and lightweight aggregates of the present invention may be prepared from low cost materials, which are generally easily available ores, their cost is also very low and therefore competitive, on a weight basis, with the prices of the traditional heavyweight aggregates. The process for the preparation thereof is also of a very simple nature, inasmuch as it merely comprises preparing a mixture of the desired oxides which are supplied by such ores, either in the presence or in the absence of water, in which latter case the water may be added later, and stirring the mixture until it reacts partially. The mixture is then dried, crushed, fired and cured, whereby a highly efficient porous aggregate is obtained which has no counterpart in the prior art.

Although the present invention has been shown and described in connection with certain specific embodiments thereof, it is to be understood that many modifications of such embodiments are possible. The present invention, therefore, is not to be restricted except insofar as is necessitated by the prior art and by the spirit of the appended claims.

What is claimed is:

1. A lightweight aggregate comprising discrete, porous and expanded alkali metal borosilicoaluminate particles having an approximately spherical shape, said aggregate having a specific weight of between about 60 and 100 kilograms per cubic meter, and a melting temperature higher than about 1500° C., said particles consisting essentially of a homogeneous admixture of acid, basic and amphoteric oxides, containing from about 20%–92% by weight of $SiO_2$, from about 1% to about 18% by weight of $B_2O_3$, from about 5% to about 60% by weight of $M_2O$, wherein M is an alkali metal, from about 1% to about 45% by weight of $Al_2O_3$, and from about 1% to about 20% by weight of an additive, wherein the ratio of $M_2O/B_2O_3$ is between 3:1 and about 6:1, and said aggregate having a compression strength of from about 140 to about 175 kilograms per square centimeter, being substantially insoluble in water, steam, acids and alkalies, and having an alkalinity equivalent to between about pH 8 and pH 9.

2. The lightweight aggregate as defined in claim 1 wherein said additive comprises an expansion promoter selected from the group consisting of calcium phosphate, whiting, iron oxide, zinc oxide, lead oxide, magnesia, cinders and soil.

3. The lightweight aggregate as defined in claim 2 wherein said additive comprises at last one strengthening agent selected from the group consisting of soil, cinders, aluminum oxide, ferric oxide, zinc oxide, lead oxide and titanium dioxide.

4. The lightweight aggregate as defined in claim 3 wherein said additive includes at least one constituent for improving the geometrical shape of the particles and the uniformity of the pores.

5. The lightweight aggregate as defined in claim 1 wherein said additive includes at least one akaline earth oxide.

6. The lightweight aggregate as defined in claim 5 wherein said alkaline earth metal oxide comprises magnesium oxide.

7. A process for making particulate lightweight porous aggregates which comprises:

preparing an aqueous paste of an alkali metal hydroxide in admixture with a mineral containing aluminum oxide, silicon dioxide in mineral form, boric oxide, a volatile material and an aggregate modifier, stirring the aqueous paste and allowing the temperature to be autogenously increased to a temperature between about 70° C. to 80° C., discontinuing the stirring action when said temperature remains unaltered for a short period of time and said paste forms a reaction mass, drying the reaction mass at a temperature of about 300° C., crushing the dried mass to form particles of the desired size, firing the particles up to a temperature of from about 650° C. to 850° C. to form expanded porous particles, and cooling the fired expanded porous particles to room temperature to form an aggregate having a specific weight of from about 140 to 250 kg/cm$^2$ said aggregate being substantially insoluble in water, steam, acids or bases and having an alkalinity equivalent to a pH of about 8 to 9.

8. The process for making particulate lightweight porous aggregates as defined in claim 7 wherein said aqueous paste comprises a mixture of sodium hydroxide, kaolin, tripoli, borax, urea, potassium nitrate and acetone.

9. The process for making particulate lightweight porous aggregates as defined in claim 8 wherein said aggregate modifier comprises an expansion promoter selected from the group consisting of clacium phosphate, whiting, sodium nitrate, potassium nitrate, sodium oxalate, potasssium oxalate, iron oxide, zinc oxide, lead oxide, magnesia, cinders and soil.

10. The process for making particulate lightweight porous aggregates as defined in claim 9 wherein said aggregate modifier comprises at least one strengthening agent selected from the group consisting of aluminum hydroxide, soil, cinders, aluminum acetate, copper acetate, amyl acetate, ethyl acetate, aluminum oxide, ferric oxide, zinc oxide, lead oxide and titanium oxide.

11. The process for making particulate lightweight porous aggregates as defined in claim 10 wherein said aggregate modifier includes at least one constituent for improving the geometrical shape of the particles and the uniformity of the pores selected from the group consisting of carbon black, urea, and volatile organic solvents.

12. The process for making particulate lightweight porous aggregates as defined in claim 11 wherein said volatile organic solvents comprise acetone or methylethylketone.

13. A process for making particulate lightweight porous aggregate which comprises: p1 preparing an aqueous paste of an alkali metal hydroxide or carbonate in admixture with suitable amounts of aluminum oxide in mineral form, boric oxide, a volatile material or a solvent, and a heavy metal oxide selected from the group consisting of iron, zinc, lead and titanium oxide in any of their mineral forms;

stirring the aqueous paste and allowing the temperature to be autogenously increased to between about 70° C. and 80° C.;

discontinuing the stirring action when said temperature remains unaltered for a short period of time to form a reaction mass;

drying the reaction mass at a temperature of about 300° C.;

crushing the dried reaction mass to form particles;

firing said particles at a temperature of from about 600° to about 1,000° C. to form expanded porous particles, and cooling the fired and expanded porous particles to room temperature to form an aggregate haing a specific weight of from about 60 to 600 kilograms per cubic meter, a compression strength of from about 140 to 250 kilograms per square caentimeter, said aggregate being substantially insoluble in water, steam, acids or bases, having a pH of between about 8 and 9, and containing from about 20 to about 92% by weight $SiO_2$, 1 to 60% by weight of $B_2O_3$, 5 to 60% by weight $M_2O$ wherein M is an alkali metal, 1 to 45% by weight $Al_2O_3$ and 1 to 20% by weight of at least one of said volatile material or said heavy metal oxide.

14. The process of claim 8 wherein said boric oxide is a member selected from the group consisting of boric acid, aluminum borate and other borates.

15. The process of claim 8 wherein said solvent is acetone or methylethylketone.

16. The lightweight aggregates as defined in claim 4 wherein said constituent for improving the geometrical shape of the particles and the uniformity of the pores is carbon black.

* * * * *